(12) United States Patent
Chen et al.

(10) Patent No.: US 8,589,228 B2
(45) Date of Patent: Nov. 19, 2013

(54) CLICK MODELING FOR URL PLACEMENTS IN QUERY RESPONSE PAGES

(75) Inventors: Weizhu Chen, Beijing (CN); Gang Wang, Beijing (CN); Zheng Chen, Beijing (CN); Zhikai Fan, Beijing (CN); Thomas Minka, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 590 days.

(21) Appl. No.: 12/795,631

(22) Filed: Jun. 7, 2010

(65) Prior Publication Data

US 2011/0302031 A1    Dec. 8, 2011

(51) Int. Cl.
- G06F 15/18      (2006.01)
- G06F 17/60      (2006.01)
- G06Q 30/00      (2012.01)
- G06N 5/02       (2006.01)

(52) U.S. Cl.
USPC .......... 705/14.53; 705/14.43; 706/12; 706/50

(58) Field of Classification Search
USPC .......... 705/14.66, 14.43; 709/224; 706/12, 50
See application file for complete search history.

(56) References Cited

U.S. PATENT DOCUMENTS

| | | | |
|---|---|---|---|
| 6,934,748 | B1 | 8/2005 | Louviere |
| 7,328,201 | B2 | 2/2008 | D'Ambrosio |
| 7,895,325 | B2 * | 2/2011 | Van Vleet et al. ............. 709/224 |
| 2005/0137939 | A1 * | 6/2005 | Calabria et al. ................ 705/26 |
| 2010/0082421 | A1 | 4/2010 | Tuladhar |

OTHER PUBLICATIONS

Chapelle, O., Y. Zhang, A dynamic Bayesian network click model for web search ranking, Proc. of the 18th Int'l Conf. on World Wide Web, WWW 2009, Apr. 20-24, 2009, pp. 1-10, Madrid, Spain.
Dupret, G., B. Piwowarski, A user browsing model to predict search engine click data from past observations, Proc. of the 31st Annual Int'l ACM SIGIR Conf. on Research and Development in Info. Retrieval, SIGIR 2008, pp. 331-338, Jul. 20-24, 2008, Singapore.
Guo, F., C. Liu, A. Kannan, T. Minka, M. J. Taylor, Y. M. Wang, C. Faloutsos, Click chain model in web search, Proc. of the 18th Int'l Conf. on World Wide Web, WWW 2009, Apr. 20-24, 2009, pp. 11-20, Madrid, Spain.
Guo, F., C. Liu, Y. M. Wang, Efficient multiple-click models in web search, Proc. of the Second Int'l Conf. on Web Search and Web Data Mining, WSDM 2009, Feb. 9-11, 2009, pp. 124-131, Barcelona, Spain.
Yan, J., N. Liu, G. Wang, W. Zhang, Y. Jiang, Z. Chen, How much can behavioral targeting help online advertising?, Proc. of the 18th Int'l Conf. on World Wide Web, WWW 2009, Apr. 20-24, 2009, pp. 261-270, Madrid, Spain.

* cited by examiner

Primary Examiner — Saga Dagnew
Assistant Examiner — Marilyn G Macasiano
(74) Attorney, Agent, or Firm — Lyon & Harr, LLP; Mark A. Watson (57) ABSTRACT

A "General Click Model" (GCM) is constructed using a Bayesian network that is inherently capable of modeling "tail queries" by building the model on multiple attribute values that are shared across queries. More specifically, the GCM learns and predicts user click behavior towards URLs displayed on a query results page returned by a search engine. Unlike conventional click modeling approaches that learn models based on individual queries, the GCM learns click models from multiple attributes, with the influence of different attribute values being measured by Bayesian inference. This provides an advantage in learning that enables the GCM to achieve improved generalization and results, especially for tail queries, than conventional click models. In addition, most conventional click models consider only position and the identity of URLs when learning the model. In contrast, the GCM considers more session-specific attributes in making a final prediction for anticipated or expected user click behaviors.

20 Claims, 4 Drawing Sheets

CLICK MODELING FOR URL PLACEMENTS IN QUERY RESPONSE PAGES

BACKGROUND

1. Technical Field

A "General Click Model" (GCM) provides various techniques for modeling or predicting user click behaviors towards URLs displayed on a search engine results page, and in particular, various techniques for using a nested Bayesian network that is inherently capable of modeling "tail queries" by building a click model on multiple attribute values that are shared across queries in combination with query-specific attributes for individual queries.

2. Related Art

Recent advances in "click modeling" have positioned it as an attractive method for representing user preferences in web search and online advertising. However, most conventional click modeling techniques focus on training the click model for individual queries, and, due to a lack of sufficient training data, cannot accurately model the tail queries (i.e., those queries after a set of the top n queries, such that there are relatively few instances of those queries). In addition, most conventional techniques consider the query, URL, and position, neglecting other useful attributes in click log data, such as the local time, geographic region, demographic data, etc.

Utilizing implicit feedback allows a search engine to better respond to its millions or billions of users. Given a query, whether the user clicks a URL is strongly correlated with the user's opinions on the URL. Besides, implicit feedback is readily available. In fact, terabytes of such data is produced every day, with which a search engine can automatically adapt to the needs of users by putting the most relevant search results and advertisements in the most conspicuous places.

Various conventional techniques use implicit feedback such as click data in various ways, including the optimization of search engine ranking functions, the evaluation of different ranking functions, and even towards the display of advertisements or news. Most such techniques rely on a core method that involves learning a click model. In general, conventional search engines log a large number of real-time query sessions, along with the user's click-or-not flags (i.e., whether or not the user clicked on a particular URL or not). This real-world data is then used as the training data for learning the click model, which is then used for predicting click-through-rates (CTR) of future query sessions. The CTR can help improve the normalized discounted cumulative gain (NDCG) (or other statistical measures) of the search results, and plays an essential role in search auctions for ad placements.

However, as is well known to those skilled in the art, clicks are biased with respect to URL presentation order (e.g., URLs higher on the page tend to be clicked more often), user-side configuration differences (e.g., display resolution, web browser being used, etc.), reputation of sites, etc. In fact, one eye-tracking experiment observed that users tend to click web documents at or near the top of a page even if the search results are shown in reverse order.

Recently, a number of studies have tried to explain position-biased click data. For example, one study suggested that the relevance of a document at position i should be further multiplied by a term $x_i$, and this idea was later formalized as the conventional "examination hypothesis" or the "position model". Another later study compared the examination hypothesis to the conventional "cascade model", which describes a user's behavior by assuming she scans from top to bottom. Because the cascade model takes into account the relevance of URLs above the clicked URL, it has been observed to outperform the examination hypothesis.

Yet another conventional technique was used to extend the examination hypothesis by considering the dependency on the positional distance to the previous click in the same query session. Related techniques have used Bayesian network click models that generalized the cascade model by analyzing user behavior in a chain-style network, within which the probability of examining the next result depends on the position and the identity of the current document.

Nevertheless, despite their successes, the conventional techniques mentioned above suffer from several limitations. First, they focus on training the click model for each individual query, and cannot accurately predict tail queries (i.e., low frequency queries beyond some number n of the top queries—generally referred to as "head queries") due to the inadequate training data. Second, the aforementioned models only consider the position-bias, neglecting other session-specific factors or biases that could potentially bias user clicks.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In general, a "General Click Model" (GCM), as described herein, provides various techniques for modeling or predicting user click behaviors towards URLs (i.e., documents, advertisements, etc.) displayed on a search or query results page by a search engine. The GCM uses a layered Bayesian network to build a click model on multiple attribute values that are shared across queries, in contrast to conventional click models that build models for individual queries. Further, by using multiple attribute values shared across queries, the GCM is sufficiently generalized to accurately predict tail queries despite the sparsity or lack of training data for a single query.

More specifically, the GCM is built upon a Bayesian network wherein an Expectation Propagation method is used to perform approximate Bayesian inference based on an "outer model" of prior Gaussian distributions of attributes across all recorded query sessions (or a relevant subset of prior recorded query sessions) in combination with an "inner model" based on session-specific attributes. The GCM model assumes that users browse URLs from top to bottom, and defines transition probabilities between URLs based on a list of attribute values, including traditional attributes such as "position" and "relevance" in addition to a set of newly considered attributes.

For example, some of these newly considered attributes for each user query include, but are not limited to, the "local hour", the "user agent" (i.e., specific web browser being used), user demographic information (age, sex, language, ethnic group, religion, etc.), user IP, user country, the ad id, the ad category, the matched keyword, etc. Note that much of this attribute data can be retrieved automatically using conventional techniques. For example, local time, user IP address, approximate geographic region, language, etc., can be determined directly from data packets associated with the user query. Further, in various embodiments, the user can optionally choose to enter or provide other information, if desired, such as age, sex, or other personalized user-specific attribute information, so that URLs provided to that user based on the GCM can be specifically tailored to the particular user. Consequently, the GCM described herein includes a number of advantageous features in comparison to conventional click models. First, the GCM is "multi-bias aware". In other words, transition probabilities between variables depend jointly on a list of multiple attributes beyond simple position and relevance.

In contrast to conventional click models, this enables the GCM to explain bias terms other than the position-bias. In addition, the GCM is capable of "learning across queries". In other words, the GCM learns queries altogether and thus can predict clicks for one query, even a new query, using the learned data from other queries. The GCM is also "extensible" such that the user (or other automated system) may actively add or remove attributes applied in the GCM model in order to tailor or customize the resulting click model for particular users. Further, the GCM is an on-line algorithm (i.e., one-pass), such that posterior distributions of the current session will be regarded as prior knowledge for the next query session (i.e., the posterior distributions of each current query session are used to update the prior distributions in the outer model). Finally, the GCM is applicable for use in ad or other URL placements within the query results page, and has been observed to outperform conventional click models in CTR-based prediction of advertisements.

In view of the above summary, it is clear that the GCM, as described herein, provides various techniques for using a Bayesian network that is capable of building an extensible click model on multiple attribute values that are shared across queries. Further, by considering particular attributes across multiple query sessions as well as session-specific attributes, the GCM is inherently capable of accurately modeling "tail queries". In addition to the just described benefits, other advantages of the GCM will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction

In general, a "General Click Model" (GCM), as described herein, provides various techniques for using a layered Bayesian to build a click model on multiple attribute values that are shared across queries for use in predicting user click behavior towards URLs displayed on a query results page returned by a search engine. More specifically, the GCM is built upon a Bayesian network wherein an Expectation Propagation (EP) process is used to perform approximate Bayesian inference based on an "outer model" of prior Gaussian distributions of attributes across all recorded query sessions (or a relevant subset of prior recorded query sessions) in combination with an "inner model" based on session-specific attributes.

Unlike conventional click modeling approaches that learn models based on individual queries, the GCM learns click models from multiple attributes, with the influence of different attribute values being measured by Bayesian inference. This provides an advantage in learning that enables the GCM to achieve improved generalization and results, especially for tail queries, than conventional click models. In addition, most conventional click models consider only position and the identity of URLs when learning the model. In contrast, the GCM considers more session-specific attributes in making a final prediction for anticipated or expected user click behaviors. Consequently, because the GCM considers attributes across sessions in relation to session-specific attributes, the GCM is also inherently capable of accurately modeling "tail queries".

For example, some of the attributes considered for each user query include, but are not limited to, the "local hour", the "user agent" (i.e., specific web browser being used), date, user demographic information (age, sex, language, ethnic group, religion, etc.), user IP address, user country, advertisement id, the advertisement category, matched keyword, etc. Note that much of this attribute data can be retrieved automatically using conventional techniques. For example, local time, date, user IP address, approximate geographic region, language, etc., can be determined directly from data packets associated with the user query.

Further, in various embodiments, the user can optionally choose to enter or provide other demographic information, if desired, such as age, sex, or other personalized attribute information, so that URLs provided to that user based on the GCM can be specifically tailored to the particular user. Further, it should also be understood that, as is well known to those skilled in the art, significant amounts of demographic data can be automatically inferred using conventional techniques to evaluate browsing and/or query history of particular users.

In general, as discussed in detail in Section 2.2, the GCM is constructed using a layered or nested structure having an outer model and an inner model that are jointly evaluated using an EP process to both return posterior distributions for the inner model based on the current query session and to update prior distributions of the outer model. The outer model of the nested structure is a Bayesian network, in which it is assumed that users scan URLs from top to bottom (note though that the GCM can be adapted to account for other scanning orders, such as left-to-right, right-to-left, etc., if desired). In the inner model, the transition probability in the network is defined to be a summation of parameters, each corresponding to a single attribute value from the current session.

More specifically, the Bayesian network of outer model is initially constructed from historical click-through data (i.e., search engine logs) containing ad click and URL impression data, and other user-specific and URL-specific attributes (either contained in the data or inferred from the data, as noted above). The inner model is based upon predicted user behaviors with respect to new queries relative to the outer model, with the information derived from new queries also being used to continuously update the outer model. In other words, as discussed in detail in Section 2.2, the GCM provides the joint outer model—inner model combination to an EP process and provides posterior distributions (click-through probabilities) from the current browsing session for use in updating the prior distributions for the next query session (for the same or different user) by using those posterior distributions to update corresponding attributes in the outer model.

Figure 1:
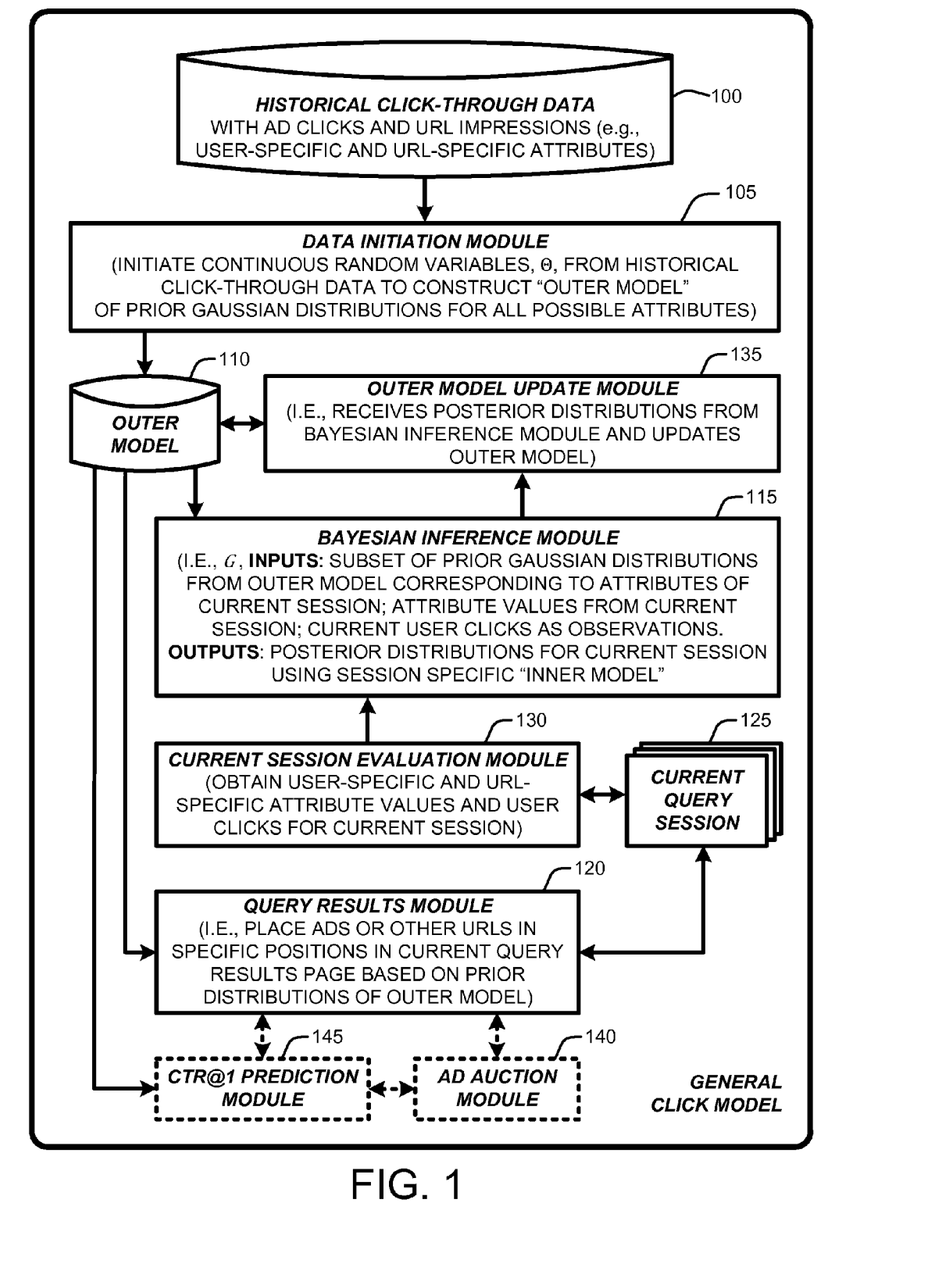
FIG. 1 provides an exemplary architectural flow diagram that illustrates program modules for implementing various embodiments of a "General Click Model" (GCM) for building an extensible click model on multiple attribute values that are shared across queries, as described herein.

1.1 System Overview:

As noted above, the GCM provides various techniques for using a Bayesian network that is capable of modeling "tail queries" to build an extensible click model on multiple attribute values that are shared across queries. The processes summarized above are illustrated by the general system diagram of FIG. 1. In particular, the system diagram of FIG. 1 illustrates the interrelationships between program modules for implementing various embodiments of the GCM, as described herein. Furthermore, while the system diagram of FIG. 1 illustrates a high-level view of various embodiments of the GCM, FIG. 1 is not intended to provide an exhaustive or complete illustration of every possible embodiment of the GCM as described throughout this document.

In addition, it should be noted that any boxes and interconnections between boxes that may be represented by broken or dashed lines in FIG. 1 represent alternate embodiments of the GCM described herein, and that any or all of these alternate embodiments, as described below, may be used in combination with other alternate embodiments that are described throughout this document.

In general, as illustrated by FIG. 1, the processes enabled by the GCM begin operation by providing one or more databases or file sets containing historical click-through data 100 from one or more groups of users to a data initiation module 105. This historical click-through data 100 includes information such as, for example, ad (or other URL) clicks and impressions, in addition to various user-specific and URL-specific attributes. The data initiation module 105 processes the historical click-through data 100 to initiate a set of continuous random variables (i.e., $\Theta$, as discussed in Section 2.2) to learn a Bayesian "outer model" 110 of prior Gaussian distributions for each of the unique attributes contained in the historical click-through data.

Then, for each separate browsing session, a Bayesian inference module 115 performs a joint EP process (or other Bayesian inference technique) using the outer model 110 derived from the historical click-through data 100, and the inner model derived from the current query session 125. More specifically, the Bayesian inference module 115 represents an EP calculator, G, as described in detail in Section 2.3, though it should be understood that other Bayesian inference techniques may also be used in place of the EP techniques described herein. The Bayesian inference module 115 receives a subset of the prior Gaussian distributions from the outer model 110 corresponding to attributes derived or extracted from the current query session 125. Note that in general, it is expected since the outer model 110 is constructed from the historical click-through data 100 of potentially millions or billions of queries, it is expected that the outer model will include significantly more attributes (both user-specific and URL-specific) than any current query session 125. As such, the inner model will generally include only a subset of the attributes in the outer model 110. The Bayesian inference module 115 also receives the attributes from the current query session 125 for use in constructing the session-based inner model in addition to current user clicks from the current query session as observations. Following the iterative EP process (which examines both the outer model 110 and the session-specific inner model), the Bayesian inference module 115 returns posterior distributions for the current query session 125.

For example, in the current query session 125, a query results module 120 returns a page of query results to the user along with a set of one or more URLs and/or advertisements that are placed in specific positions on the page based on the prior distributions of the outer model 110. In combination with these processes, a current session evaluation module 130 obtains the user-specific and URL-specific attributes for the current query session 125 and provides this information to the Bayesian inference module 115 for use in the above-described EP process. In addition, the current session evaluation module 130 also returns user click observations to the Bayesian inference module 115 (again, as noted above) for use in the EP process.

Given the posterior distributions returned by the Bayesian inference module 115, an outer model update module 135 is then used to update the prior distributions (with respect to attributes corresponding to any attributes considered in the current query session 125). The updated prior distributions of the outer model are then used by the Bayesian inference module 115 for the next query session, which also results in a further update of those prior distributions via the outer model update module 135.

In addition to simply placing URLs and/or advertisements in positions likely to receive user clicks, in various embodiments, the GCM uses the posterior information of the outer model 110 for various additional purposes. For example, in various embodiments, this includes computing values such as CTR@1 (i.e., the click-through rate or probability of click for a URL or advertisement placed at position 1) via a CTR@1 prediction module 145. As is known to those skilled in the art, CTR@1 is used for a number of well-known purposes. Further, in various embodiments, the posterior distributions are used for real-time ad auctions (either directly, or in cooperation with the calculation of CTR@1) wherein an ad auction module 140 ensures that the highest bidding ads are placed in the highest positions via the query results module 120.

2.0 Operational Details Of The General Click Model

The above-described program modules are employed for implementing various embodiments of the GCM. As summarized above, the GCM provides various techniques for using a Bayesian network that is capable of modeling "tail queries" to build a click model on multiple attribute values that are shared across queries. The following sections provide a detailed discussion of the operation of various embodiments of the GCM, and of exemplary methods for implementing the program modules described in Section 1 with respect to FIG. 1. In particular, the following sections provide examples and operational details of various embodiments of the GCM, including: general definitions and considerations used in describing the GCM; implementation of the GCM, including a discussion of the outer model and the inner model; Bayesian inference for learning the GCM from the nested outer/inner model combination; and additional embodiments and considerations of the GCM, including discussion of various extensions to the attributes and models described herein.

2.1 General Definitions And Considerations

The following paragraphs are provided to clarify various terms, definitions, and concepts (some of which are specifically identified as conventional ideas) that will be used throughout this paper.

When a user submits a query to the search engine, a query session is initiated. Specially, if a user re-submits the same query, a different query session is initiated. In the click model described herein, the GCM only process the first page on a query session, however, as discussed in further detail in Section 2.4, the GCM can be extended to consider the usage of additional pages.

In each query session, there is a sequence of URLs, denoted by $U=\{u_1, \ldots u_M\}$ where the smaller subscript represents a higher rank, i.e. closer to the top. For regular search results, M is usually set to 10; while for ads data, M varies for different queries.

In the query session, each display of a URL is called a URL impression, which is associated with a list of attribute values, such as the user's IP address, the user's local time and the category of the URL.

The following subsections (i.e., Section 2.1.1 and Section 2.1.2) are provided to introduce prior conventional work concerning click models, which fall into two categories: examination hypothesis and cascade model.

2.1.1 Examination Hypothesis:

The conventional "examination hypothesis" assumes that if a displayed URL is clicked, it must be both examined and relevant. This assumption is based on conventional eye-tracking studies that demonstrate that users are less likely to click URLs in lower ranks (even if those URLs are reversed). In other words, the higher a URL is ranked (and thus the higher it is placed on the page), the more likely it will be examined. On the other hand, the relevance of a URL is a query-document based parameter that directly measures the probability that a user intends to click this URL if she examines it. More precisely, given a query q and the URL u at position i, the examination hypothesis assumes the probability of the binary click event C as follows, where a hidden random variable, E, is used to denote whether the user examined the URL:

$$P(C=1 \mid q, u, i) = \underbrace{P(C=1 \mid u, q, E=1)}_{r_{u,q}} \cdot \underbrace{P(E=1 \mid i)}_{x_i} \quad \text{Equation (1)}$$

In general, the examination hypothesis makes the following assumptions:

a. If the user clicks a URL, then that URL must have been examined;
b. If the user examined the URL, the click probability only depends on the relevance, $r_{u,q}$; and
c. The examination probability $x_i$ depends solely on the position i of the URL.

Note that the examination hypothesis is well known to those skilled in the art, and will not be described in further detail herein.

Based on the examination hypothesis, three simple models studying $r_{u,q}$ and $x_i$ have been introduced in various well-known conventional systems: the "Clicks Over Expected Clicks" (COEC) model, the "Examination model," and the "Logistic model." Note that each of these models have been compared and experimentally proven to be outperformed by the conventional cascade model described in Section 2.1.2.

One extension of the examination hypothesis is the conventional "user browsing model" (UBM) that assumes the examination E depends not only on the position i but also on the previous clicked position, l, in the same query session (where l=0 if there is no previous click in a particular session). This extension is illustrated by Equation (2):

$$P(C=1 \mid q, u, i, l) = \underbrace{P(C=1 \mid u, q, E=1)}_{r_{u,q}} \cdot \underbrace{P(E=1 \mid i, l)}_{x_{i,l}} \quad \text{Equation (2)}$$

2.1.2 Cascade Model:

The conventional "cascade model" differs from the examination hypothesis (and related extensions) described above in that it aggregates the clicks and skips in a single query session into a single model. The cascade model assumes the user examines the URL from the first one to the last one, and the click depends on the relevance of all of the URLs shown above.

In particular, let $E_i$, $C_i$ be the probablistic events indicating whether the ith URL ($1 \leq i \leq M$) is both examined ($E_i$) and clicked ($C_i$), respectively. The cascade model makes the following assumptions:

a. $P(E_1)=1$;

b. $P(E_{i+1}=1 \mid E_i=0)=0$;

c. $P(E_{i+1}=1 \mid E_i=0, C_i)=1-C_i$; and d. $P(C_i=1 \mid E_i=1)=r_{u_i,q}$, where $u_i$ is the ith URL in which the third assumption (i.e., assumption (c)), implies that if a user finds her desired URL, she immediately closes the session; otherwise she continues the examination. The cascade model further assumes that there is no more than one click in each query session, and if examined, a URL is clicked with probability $r_{u,q}$ and skipped with probability $1-r_{u,q}$. These concepts and assumptions are illustrated below in Equation (3):

$$P(C_i=1) = r_{u_i,q} \prod_{j=1}^{i-1} (1-r_{u_j,q}) \quad \text{Equation (3)}$$

Note that the cascade model is well known to those skilled in the art, and will not be described in further detail herein.

Based on the above-described cascade model, two conventional Bayesian network models have been introduced, which both modify the third assumption shown above (i.e., assumption (c), which states: $P(E_{i+1}=1 \mid E_i=1, C_i)=1-C_i$), and which allow multiple clicks in a single session. These two models, i.e., CCM and DBN, are separately introduced in the following paragraphs.

Click Chain Model (CCM)

The conventional click chain model (CCM) was introduced as an extension to the cascade model. The CCM differs from the original cascade model in defining the transition probability from the ith URL to the (i+1)th URL. In particular, CCM replaces the third assumption in the cascade model (i.e., assumption (c), shown above) with the following:

a. $P(E_{i+1}=1 \mid E_i=1, C_i=0)=\alpha_1$      Equation (4)

b. $P(E_{i+1}=1 \mid E_i=1, C_i=1)=\alpha_2(1-r_{u_i,q})+\alpha_3 r_{u_i,q}$      Equation (5)

where $\alpha_1, \alpha_2, \alpha_3$ are three global parameters independent of the users and the URLs. CCM assumes that if the URL at position i has been examined, the user clicks it according to the relevance $r_{u_i,q}$ as usual; if the user chooses not to click, the probability of continuing is $\alpha_1$; if the user clicks, the probability to continue ranges between $\alpha_2$ and $\alpha_3$, depending on the relevance $r_{u_i,q}$.

CCM assumes that $\alpha_1$, $\alpha_2$, $\alpha_3$ are given and fixed, and then leverages the Bayesian inference to infer the posterior distribution of the document relevance, r. Further, under the "infinite-chain" assumption, a simple method in computing the posterior was derived that allows the conventional CCM to run very efficiently (i.e., lower computational overhead). Note that the CCM model is well known to those skilled in the art, and will not be described in further detail herein.

Dynamic Bayesian Network (DBN):

As with the CCM described above, the DBN model is another conventional extension to cascade model. In general, the DBN model is very similar to CCM described above, but differs in the transition probability as illustrated below:

$a.\ P(E_{i+1}=1|E_i=1,C_i=0)=\gamma$  Equation (6)

$b.\ P(E_{i+1}=1|E_i=1,C_i=1)=\gamma(1-s_{u_i,q})$  Equation (7)

where $\gamma$ is a pre-defined parameter, and $s_{u_i,q}$, in place of $r_{u_i,q}$, is the measurement of the user's satisfaction on the actual content of $u_i$ given query q. Note that in the DBN model, it is important to understand that a click does not necessarily mean that the user is satisfied. Therefore, the introduction of $s_{u_i,q}$ is used to depict the actual relevance, rather than the perceived relevance, $r_{u_i,q}$. Both of these values are estimated by applying an expectation-maximization algorithm. Note that the DBN model is well known to those skilled in the art, and will not be described in further detail herein.

2.2 General Click Model (Gcm)

In general, the (GCM) is a nested structure having an outer model and an inner model. The outer model of the nested structure is a Bayesian network, in which it is assumed that users scan URLs from top to bottom (note though that the GCM can be adapted to account for other scanning orders, such as left-to-right, right-to-left, etc., if desired). In the inner model, the transition probability in the network is defined to be a summation of parameters, each corresponding to a single attribute value. This nested structure enables the GCM to overcome not only the position-bias associated with conventional click models, but also other kinds of bias in learning relevance and predicting clicks.

Figure 2:
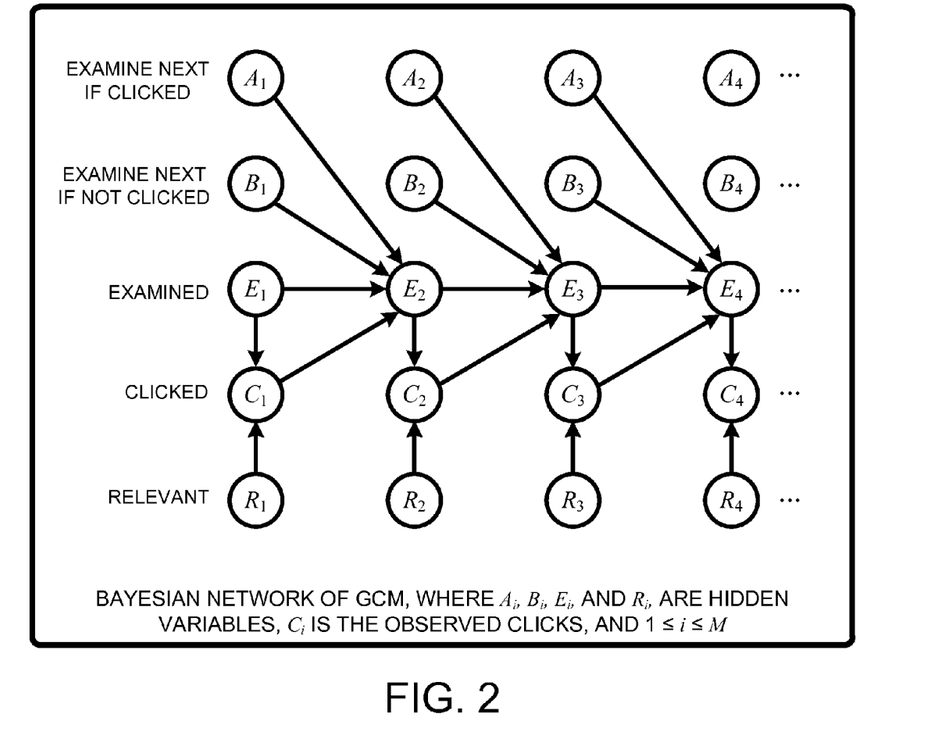
FIG. 2 provides an example a Bayesian network for the GCM, showing relationships between attribute-based hidden variables and observed user clicks, as described herein.
Figure 3:
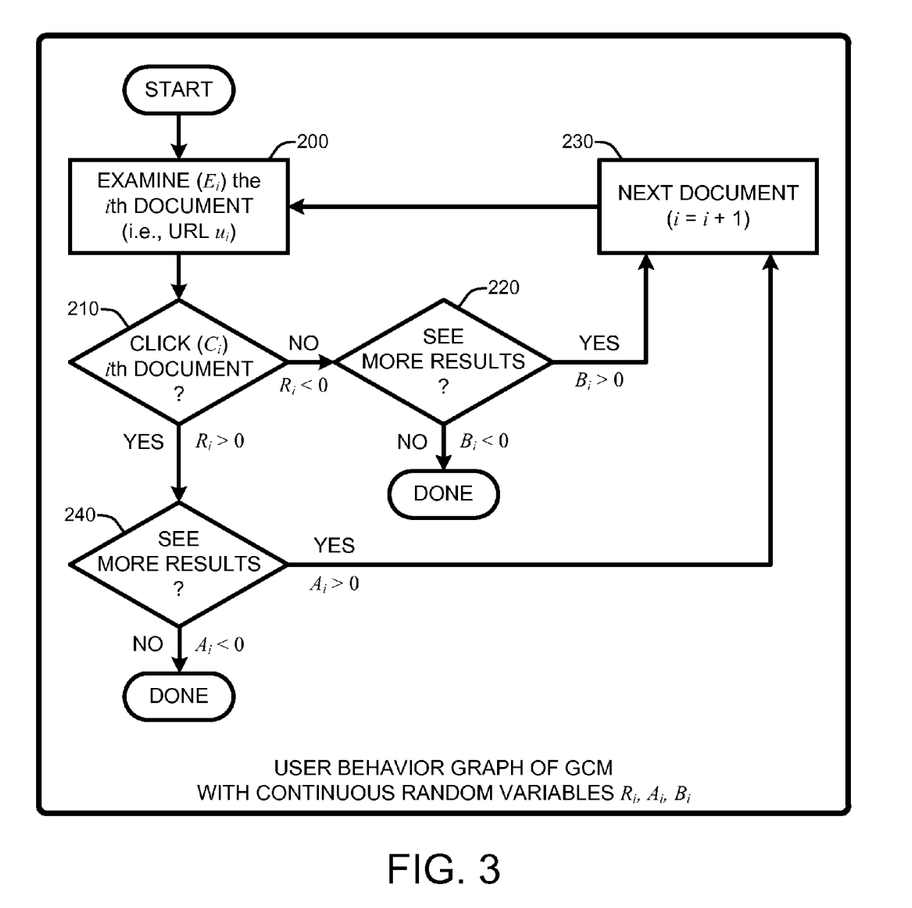
FIG. 3 illustrates a user behavior graph, with respect to clicks, for the GCM showing continuous random variables based on session-specific attributes, as described herein.

2.2.1 GCM Outer Model:

The outer Bayesian network of the GCM is illustrated by FIG. 2, and a flow chart of user behavior (i.e., the "inner model") is illustrated by FIG. 3. In both FIG. 2 and FIG. 3, the subscripts range from 1 to M, where M is the total number of URLs on the page. For purposes of consistency with other click models, two binary random variables $C_i$ and $E_i$ are defined as indicating whether the user clicks ($C_i$) or examines ($E_i$) the URL on the ith position. In addition, as illustrated by FIG. 3, three continuous random variables are employed at each position, $A_i$, $B_i$ and $R_i$. The continuous behavior of $A_i$, $B_i$ and $R_i$ enables GCM to handle not only the position-bias but other kinds of session-specific biases, as discussed in further detail below.

As illustrated by FIG. 3, it is assumed that the user examines the displayed documents or URLs from position i=1 to i=M. In particular, after examining 200 URL $u_i$ ($E_i$=1), the user chooses 210 to click ($C_i$) that URL according to the relevance $R_i$. As illustrated, the binary click event ($C_i$) will occur if and only if $R_i>0$. Either way, the user will continue 220 to examine the next 230 URL $u_{i+1}$ with some probability: if $u_i$ has been clicked ($C_i$=1), the user will continue 240 examine 200 $u_{i+1}$ if and only if $A_i>0$; if $u_i$ has not been clicked ($C_i$=0), the user will examine 200 $u_{i+1}$ if and only if $B_i>0$. The following equation sets precisely describe this model:

$a.\ P(E_1)=1$  Equation (8)

$b.\ P(E_{i+1}=1|E_i=0)=0$  Equation (9)

$c.\ P(E_{i+1}=1|E_i=1,C_i=0,B_i)=\Pi(B_i>0)$  Equation (10)

$d.\ P(E_{i+1}=1|E_i=1,C_i=1,A_i)=\Pi(A_i>0)$  Equation (11)

$e.\ P(C_i=1|E_i=1,R_i)=\Pi(R_i>0)$  Equation (12)

where $\Pi(\cdot)$ is the characteristic function and $\Phi$ is defined as $\Phi=\{A_i, B_i, R_i | i=1 \ldots M\}$. This model differs from DBM or CCM in that the transition probability depends on continuous random variables in $\Phi$. The following paragraphs show that those variables are further modeled as the summation of a list of parameters, each corresponding to an attribute value.

2.2.2 GCM Inner Model:

When a query session is initiated with query q and URLs $U=\{u_1, \ldots u_M\}$, the attributes the search engine holds are far beyond the URL and the query itself (since the outer model is derived from potentially millions or billions of historical query sessions). The GCM separates session-specific attributes into two categories:

a. User-Specific Attributes: the query, the location, the browser type, the local hour, the IP address, the query length, demographic information, etc. For each user, these values are denoted by $f_1^{user}, \ldots f_s^{user}$; and b. URL-Specific Attributes: the URL, the displayed position (i.e., the URL at position i), the classification of the URL, the matched keyword, the length of the URL, etc. For a specific URL $u_i$, these attribute values are denoted by $f_{i,1}^{url}, \ldots f_{i,t}^{url}$.

As a simple example, consider the following five attributes: the specific query, the browser type, the local hour, the URL, and the position, giving s=3 (i.e., three user-specific attributes, including query, browser and time), and t=2 (i.e., two URL specific attributes, including URL and position). It is important to understand that more of fewer attributes, both user-specific and URL-specific, can be used, if desired, and that the specific attributes illustrated in this example are provided only for purposes of explanation. Using the example attributes indicated above, a simple example of a specific URL impression on position 2, might have the following values, as illustrated in Table 1:

TABLE 1

Examples of User- and URL- Specific Attributes

| ATTRIBUTE | TERM | VARIABLE |
|---|---|---|
| User-Specific Attributes | | |
| Query Term | "Microsoft Research" | $f_1^{user}$ |
| Browser Type | "Internet Explorer" | $f_2^{user}$ |
| Local Time | "7 PM" | $f_3^{user}$ |
| URL-Specific Attributes | | |
| URL | "research.microsoft.com" | $f_{2,1}^{url}$ |
| Position on Page | "2" | $f_{2,2}^{url}$ |

For purposes of explanation, it is assumed that the attributes are all of discrete values. However, it should be understood, that as discussed in Section 2.4, continuous feature values (i.e., attributes) may also be considered when learning the click model provided by the GCM. Furthermore, it is assumed that each value f is associated with three parameters $\theta_f^A$, $\theta_f^B$ and $\theta_f^R$, each of which is a continuous random variable, where:

$$A_i = \sum_{j=1}^{s} \theta_{f_j^{user}}^A + \sum_{j=1}^{t} \theta_{f_{i,j}^{url}}^A + \text{err}$$

$$B_i = \sum_{j=1}^{s} \theta_{f_j^{user}}^B + \sum_{j=1}^{t} \theta_{f_{i,j}^{url}}^B + \text{err}$$

$$R_i = \sum_{j=1}^{s} \theta_{f_j^{user}}^R + \sum_{j=1}^{t} \theta_{f_{i,j}^{url}}^R + \text{err}$$

Equation (13)

where err is an error term satisfying $N(0,1)$ distribution. For purposes of explanation, $\Theta = \{\Theta_f^A, \Theta_f^B, \Theta_f^R | \forall f\}$ is defined where f enumerates all distinct attribute values. $A_i$, $B_i$ and $R_i$ are then treated as the summation of s+t parameters in 0 (i.e., the user-specific and URL specific attributes, respectively), and the parameters satisfy independent Gaussian distributions. Note that as discussed above, "s" represents the total number user-specific attributes (i.e., $f_i^{user}$), while "t" represents the number of URL specific attributes (i.e., $f_{i,t}^{url}$) at position i, as discussed above. It is important to note that the variables in $\Phi$ (see definition of $\Phi$ in Section 2.2.1) are defined for a specific query session, while parameters in $\Theta$ are defined across sessions. Bayesian inference is then used to learn distributions for the parameters.

2.3 Bayesian Inference For Learning The General Click Model

In a tested embodiment of the GCM, the learning algorithm used by the GCM for generating the click model is built using conventional learning techniques, such as, for example, the well-known Expectation Propagation (EP) method. However, it should be understood that other conventional Bayesian inference type learning techniques may also be used to learn the click model given the framework of the joint outer model and inner model structured as a Bayesian network having hidden variables, as described herein. Note that EP-based learning and other Bayesian inference learning are well known to those skilled in the art, and will not be described in detail herein.

For example, given the structure of a Bayesian network with hidden variables, as illustrated by FIG. 2, EP takes the observation values as input, and is capable of calculating the inference of any variable. In particular, given an EP calculator G (or other technique based on Bayesian inference) as stated previously, each parameter in $\Theta$ is assigned a Gaussian distribution. This distribution is then updated using an assumed-density filtering mechanism, where, for each query session, the calculated posterior distributions are used as the prior distributions for the next query session, as illustrated by the following algorithm which describes the use of the GCM for learning the click model:

1. Initiate $\Theta = \Theta = \{\Theta_f^A, \Theta_f^B, \Theta_f^R | \forall f\}$ and let each parameter in $\Theta$ satisfy a prior, $N(0,1/(s+t))$
2. Construct a Bayesian inference calculator G using Expectation Propagation, or other Bayesian learning technique
3. For each session s
   a. M←number of URLs in s (as noted above, for regular search results, M is usually set to 10 or some other desired number; while for advertisement data, M varies for different queries)
   b. Obtain the attribute values:

$$F = \{f_1^{user}, \ldots, f_s^{user}\} \cup \{f_{i,1}^{url}, \ldots, f_{i,t}^{url}\}_{i=1}^{M}$$

c. Input $\{\Theta_f^A, \Theta_f^B, \Theta_f^R | f \in F\} \subset \Theta$ to G as the prior Gaussian distributions
   d. Input the user's clicks to G as observations
   e. Execute the G, measure the posterior distributions for $\{\Theta_f^A, \Theta_f^B, \Theta_f^R | f \in F\}$, and update them in $\Theta$
4. End For At the beginning of the algorithm, it is assumed that all parameters in $\Theta$ satisfy a default prior Gaussian distribution, say $N(0,1/(s+t))$, for all distinct values f. It is further assumed that the nested Bayesian network (i.e., the outer model and inner model described in Sections 2.2.1 and 2.2.2, respectively) has been constructed and the Bayesian inference calculator G is properly set.

As illustrated by the algorithm provided above (see step 3), the query sessions for each individual user (or each individual query session) are processed one by one. For each incoming session its attribute value list, F, containing both user-specific attributes and URL specific attributes, is obtained as illustrated below:

$$F = \{f_1^{user}, \ldots, f_s^{user}\} \cup \{f_{i,1}^{url}, \ldots, f_{i,t}^{url}\}_{i=1}^{M}$$

The corresponding parameters in $\Theta$ are then retrieved as prior Gaussian distributions for G, along with the corresponding click-or-not flags for the URLs. G (i.e., the aforementioned EP calculator) then calculates the posterior Gaussian distributions of $\theta_f^A$, $\theta_f^B$ and $\theta_f^R$ for each related attribute value, $f \in F$. The inferred posterior Gaussians are then saved for the next iteration.

Note that if M is fixed, the Bayesian network structure stays fixed throughout the algorithm. Though values $f_j^{user}$ and $f_{i,j}^{url}$ vary from session to session, however, the structure of the Bayesian factor graph (see FIG. 2 and Equation (13)) remains unique. In other words, $A_i$, for example, is the summation of s+t Gaussians and an err term. This behavior enables the GCM to pre-calculate the Bayesian inference formula for G and speed up the on-line inference calculation in various embodiments. However, this pre-calculation step is optional. Note also that if M varies, such as for different advertisement data, the GCM will build M different Bayesian inference calculators, $G_1$, $G_2$, ..., and classify the query session according to the corresponding value M.

2.4 Additional Embodiments and Considerations of the GCM:

The following paragraphs describe various extensions and additional embodiments of the GCM.

2.4.1 Learning CTR@1:

One frequently used by-product of the click model is an unbiased CTR measurement assuming the URL is placed at position 1 (i.e., "CTR@1"). This value can be further used to improve NDCG or other performance measure, or to build an auction for ad placements. In general, the GCM is capable of predicting CTR@1 as discussed below.

In particular, CTR@1 can be learned using techniques very similar to the GCM techniques described above. Specifically, for a given URL impression, assuming its position to be 1, some of the user-specific attributes are missing during the prediction, such as the local hour and user location. Under these circumstances, the GCM calculates the expected distributions $\mathbb{E}[A_i]$, $\mathbb{E}[B_i]$ and $\mathbb{E}[R_i]$ over the distributions of all missing attributes. Practically, these distributions can be approximated by the empirical data. Therefore, $P(R_1 > 0)$ is the probability of clicks if this URL is put at position 1, i.e., the desired CTR@1 value.

2.4.2 Using Variance:

One useful feature of the GCM is that each attribute value is associated with a variance (i.e., Θ) attached to its Gaussian distribution. This value measures the significance of this attribute so that an extra confidence calculation is no longer needed, such as would be required by various conventional click model techniques. Therefore, if GCM is applied to a real-time search engine, for example, this variance can be updated periodically, e.g., once a day (or any other desired period), because web data keeps changing as time goes by.

2.4.3 Using Continuous Attribute Values:

As noted above, the GCM generally assumes the attribute values to be discrete, however, there might exist some continuous attributes, e.g., the widely used BM25 score in ranking. Note that BM25 is well known ranking function used by search engines to rank matching documents according to their relevance to a given search query. Note that BM25 is based on a probabilistic retrieval framework developed in the 1970s and 1980s by Stephen E. Robertson, Karen Spärck Jones, and others, and will not be described in detail herein.

One way to incorporate a continuous attribute such as BM25, or other continuous attribute, is to divide the continuous values of that attribute into discrete bins, such as, for example, 1,000 equal-width intervals. A more straight-forward way is to modify Equation (13) by adding multiplication terms such as $\theta_{BM25}^R \cdot x$, where x is the BM25 value and $\theta_{BM25}^R$ is a global parameter that is independent of the value x. The global parameter $\theta_{BM25}^R$ behaves as a dynamic weight associated to this attribute, and can be learned by Bayesian inference. Consequently, it should be understood that the GCM described herein is fully capable of operating with any desired combination of discrete and continuous attributes.

2.4.4 Using the Page Structure to Determine Area-Based CTRs:

In general, the GCM can make use of the pagination links on the search page in designing a more accurate Bayesian network. Significantly, in the ads distribution of a commercial search engine, URL impressions are often allocated in two different areas—the main line and the side bar. It has been observed that the actual CTR of ads in the main line (i.e., arranged in line with or above the query results) is significantly larger than the CTR of ads in the side bar (generally a region on the right side of the page across from the query results. Consequently, in various embodiments, the GCM is separated into two distinct parts in order to address the area-bias of the CTR estimation in advertisement data placed in separate and distinct areas of the page (i.e., the main line and the side bar of the query results page). In other words, one instance of the GCM can be instantiated for each of a plurality of separate areas or regions on the query results page returned by the search engine in order to provide CTR predictions having increased accuracy relative to the URLs in each of those separate areas or regions.

Figure 4:
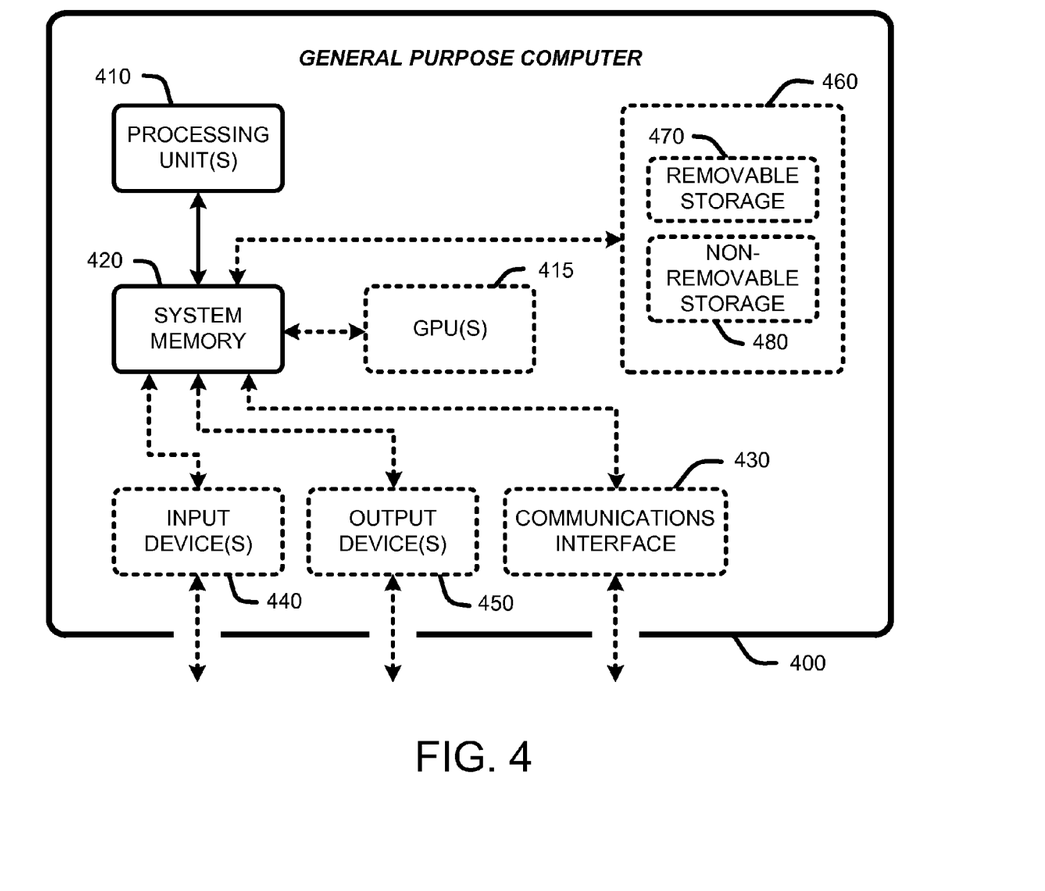
FIG. 4 is a general system diagram depicting a simplified general-purpose computing device having simplified computing and I/O capabilities for use in implementing various embodiments of the GCM, as described herein.

3.0 Exemplary Operating Environments:

The GCM described herein is operational within numerous types of general purpose or special purpose computing system environments or configurations. FIG. 4 illustrates a simplified example of a general-purpose computer system on which various embodiments and elements of the GCM, as described herein, may be implemented. It should be noted that any boxes that are represented by broken or dashed lines in FIG. 4 represent alternate embodiments of the simplified computing device, and that any or all of these alternate embodiments, as described below, may be used in combination with other alternate embodiments that are described throughout this document.

For example, FIG. 4 shows a general system diagram showing a simplified computing device 400. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, video media players, etc.

To allow a device to implement the GCM, the device should have a sufficient computational capability and system memory. In particular, as illustrated by FIG. 4, the computational capability is generally illustrated by one or more processing unit(s) 410, and may also include one or more GPUs 415, either or both in communication with system memory 420. Note that that the processing unit(s) 410 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 4 may also include other components, such as, for example, a communications interface 430. The simplified computing device of FIG. 4 may also include one or more conventional computer input devices 440. The simplified computing device of FIG. 4 may also include other optional components, such as, for example, one or more conventional computer output devices 450. Finally, the simplified computing device of FIG. 4 may also include storage 460 that is either removable 470 and/or non-removable 480. Such storage includes computer readable media including, but not limited to, DVD's, CD's, floppy disks, tape drives, hard drives, optical drives, solid state memory devices, etc. Further, software embodying the some or all of the various embodiments, or portions thereof, may be stored on any desired combination of computer readable media in the form of computer executable instructions. Note that typical communications interfaces 430, input devices 440, output devices 450, and storage devices 460 for general-purpose computers are well known to those skilled in the art, and will not be described in detail herein.

The foregoing description of the GCM has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the GCM. It is intended that the scope of the invention be limited not by this detailed description, but rather by the claims appended hereto.

What is claimed is:

1. A computer-implemented process for modeling user click-through behaviors, comprising using a computer to perform process actions for:

receiving one or more databases of historical click-through data derived from one or more groups of users, said historical click-through data comprising click and impression data for URLs in combination with discrete user-specific and URL-specific attributes for each URL;

processing the historical click-through data to learn a Bayesian "outer model" of prior Gaussian distributions comprising a set of continuous random variables corresponding to each of the attributes contained in the historical click-through data;

constructing a query response page based on the prior Gaussian distributions of the outer model in response to a current query session, and providing that query response page to a user display device;

constructing a session-specific probabilistic "inner model" using discrete user-specific and URL-specific attributes derived from the current query session;

performing a joint Bayesian inference using the prior Gaussian distributions of the outer model in combination with the inner model and observations of user clicks in the current query session to learn posterior distributions for the current query session; and using the posterior distributions for the current query session, updating any prior Gaussian distributions in the outer model corresponding to the user-specific and URL-specific attributes derived from the current query session.

2. The computer-implemented process of claim 1 wherein the query response page includes a set of query results and one or more URLs that are placed in specific positions on the query response page based on the prior Gaussian distributions of the outer model.

3. The computer-implemented process of claim 1 wherein the query response page includes a set of one or more advertisements that are placed in specific positions on the query response page based on the prior Gaussian distributions of the outer model.

4. The computer-implemented process of claim 3 further comprising an automated online advertisement auction, and wherein advertisements are automatically selected for specific positions based on bid levels for corresponding advertisements relative to the prior Gaussian distributions of the outer model.

5. The computer-implemented process of claim 1 further comprising process actions for computing a "click-through rate at position 1" (i.e., "CTR@1") for one or more URLs, said URLs including one or more advertisements.

6. The computer-implemented process of claim 5 wherein CTR@1 is computed for two or more distinct regions on the query results page, each region comprising multiple URLs.

7. The computer-implemented process of claim 1 further comprising a user interface to allow the user to provide one or more additional user-specific attributes corresponding to demographic information that cannot be automatically derived from the current query session.

8. The computer-implemented process of claim 1 wherein the attributes corresponding to the prior Gaussian distributions in the outer model include an associated variance that provides a measure of the significance of each attribute, and wherein the variance associated with each attribute is periodically updated at one or more predetermined intervals as more query sessions are evaluated over time.

9. The computer-implemented process of claim 1 wherein one or more of the attributes are continuous, rather than discrete, and wherein dynamic weights are automatically learned through Bayesian inference for weighting each continuous attribute, and wherein these weighted attributes are included in the joint Bayesian inference using the prior Gaussian distributions of the outer model in combination with the inner model and observations of user clicks in the current query session to learn the posterior distributions for the current query session.

10. A system for modeling user click-through behaviors comprising:

a device for receiving one or more databases of historical click-through data, said click-through data comprising click and impression data for specific URLs in combination with discrete user-specific and URL-specific attributes associated with each URL;

a device for automatically learning a Bayesian "outer model" of prior Gaussian distributions comprising a set of continuous random variables corresponding to each of the attributes of the historical click-through data;

a device for constructing a query response page for a current query session based on the outer model, and providing that query response page to a user display device;

a device for constructing a session-specific probabilistic "inner model" using discrete user-specific and URL-specific attributes derived from the current query session;

a device for performing a joint Bayesian inference between the outer model and the inner model relative to observations of user clicks in the current query session to learn posterior distributions for the current query session; and a device for using the posterior distributions for the current query session to update any prior Gaussian distributions in the outer model corresponding to the user-specific and URL-specific attributes derived from the current query session.

11. The system of claim 10 wherein the query response page includes a set of query results and one or more URLs that are placed in specific positions on the query response page based on the prior Gaussian distributions of the outer model.

12. The system of claim 10 wherein the query response page includes a set of one or more advertisements that are placed in specific positions on the query response page based on the prior Gaussian distributions of the outer model.

13. The system of claim 12 further comprising an automated online advertisement auction, and wherein advertisements are automatically selected for specific positions based on bid levels for corresponding advertisements relative to the prior Gaussian distributions of the outer model.

14. The system of claim 10 further comprising a device for computing a "click-through rate at position 1" (i.e., "CTR@1") for one or more URLs, said URLs including one or more advertisements.

15. A computer-readable storage device having computer executable instructions stored therein for modeling user click-through behaviors, said instructions comprising:

receiving one or more databases of historical click-through data derived from one or more groups of users, said historical click-through data comprising click and impression data for URLs in combination with discrete user-specific and URL-specific attributes for each URL;

processing the historical click-through data to learn a Bayesian "outer model" of prior Gaussian distributions comprising a set of continuous random variables corresponding to each of the attributes contained in the historical click-through data;

constructing a query response page in response to a current query session, said query response page including a set of query results and one or more URLs that are placed in specific positions on the query response page based on the prior Gaussian distributions of the outer model relative to user provided query term defining the current query session;

displaying the query response page on a user display device;

constructing a session-specific probabilistic "inner model" using discrete user-specific and URL-specific attributes derived from the current query session;

performing a joint Bayesian inference using the prior Gaussian distributions of the outer model in combination with the inner model and observations of user clicks in the current query session to learn posterior distributions for the current query session; and using the posterior distributions learned for the current query session to update prior Gaussian distributions in the outer model corresponding to the user-specific and URL-specific attributes derived from the current query session.

16. The computer-readable storage device of claim 15 wherein the query response page further comprises a set of one or more advertisements that are placed in specific positions on the query response page based on the prior Gaussian distributions of the outer model.

17. The computer-readable storage device of claim 16 further comprising an associated automated online advertisement auction, and wherein advertisements are automatically selected for specific positions based on bid levels for corresponding advertisements relative to the prior Gaussian distributions of the outer model.

18. The computer-readable storage device of claim 15 further comprising instructions for computing a "click-through rate at position 1" (i.e., "CTR@1") for one or more of the URLs on the query response page, said URLs including one or more advertisements.

19. The computer-readable storage device of claim 15 wherein CTR@1 is separately computed for two or more distinct regions on the query results page, each region comprising multiple URLs.

20. The computer-readable storage device of claim 15 further comprising a user interface to allow the user to provide one or more additional user-specific attributes corresponding to additional demographic information that cannot be automatically derived from the current query session.

\* \* \* \* \*